United States Patent
Pawlow et al.

(10) Patent No.: US 7,132,503 B2
(45) Date of Patent: Nov. 7, 2006

(54) REMOVING GELLED UNSATURATED ELASTOMERS FROM POLYMERIZATION EQUIPMENT ASSOCIATED WITH THEIR PRODUCTION

(75) Inventors: James H. Pawlow, Canton, OH (US); David M. Roggeman, North Royalton, OH (US); Daniel Graves, Canal Fulton, OH (US); William Hergenrother, Akron, OH (US); James Oziomek, Cuyahoga Falls, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/898,638

(22) Filed: Jul. 23, 2004

(65) Prior Publication Data
US 2005/0026797 A1   Feb. 3, 2005

Related U.S. Application Data

(60) Provisional application No. 60/490,642, filed on Jul. 28, 2003.

(51) Int. Cl.
*C08F 6/00*   (2006.01)
(52) U.S. Cl. .................. 528/480; 422/131; 502/150; 510/188
(58) Field of Classification Search .............. 422/131; 502/150; 510/188; 528/480
See application file for complete search history.

(56) References Cited

U.S. PATENT DOCUMENTS

| 5,312,940 | A | | 5/1994 | Grubbs et al. | |
|---|---|---|---|---|---|
| 5,342,909 | A | | 8/1994 | Grubbs et al. | |
| 5,446,102 | A | * | 8/1995 | Oziomek et al. | ........... 525/245 |
| 5,728,917 | A | | 3/1998 | Grubbs et al. | |
| 5,831,108 | A | | 11/1998 | Grubbs et al. | |
| 5,969,170 | A | | 10/1999 | Grubbs et al. | |
| 6,111,121 | A | | 8/2000 | Grubbs et al. | |
| 6,211,391 | B1 | | 4/2001 | Grubbs et al. | |
| 6,624,265 | B1 | | 9/2003 | Grubbs et al. | |
| 6,696,597 | B1 | | 2/2004 | Pederson et al. | |
| 2003/0181609 | A1 | | 9/2003 | Grubbs et al. | |
| 2003/0236427 | A1 | | 12/2003 | Grubbs et al. | |
| 2004/0097745 | A9 | | 5/2004 | Grubbs et al. | |

FOREIGN PATENT DOCUMENTS

| EP | 1 130 025 A1 | | 9/2001 |
|---|---|---|---|
| EP | 1130025 | * | 9/2001 |
| WO | WO 96/04289 | * | 2/1996 |

OTHER PUBLICATIONS

Stuart W. Craig et al. "Highly efficient acyclic dien metathesis depolymerization using a ruthenum catalyst containing a N-heterocycli carbene ligand" Macromolecules, vol. 34 2001, pp. 7929-7931.*

An article entitled "Highly Efficient Acyclic Diene Metathesis Depolymerization Using a Ruthenium Catalyst Containing a N-Heterocyclic Carbene Ligand," MACROMOLECULES, vol. 34, 2001, pp. 7929-7931, XP002303492, the whole document.

* cited by examiner

*Primary Examiner*—Terressa Boykin
(74) *Attorney, Agent, or Firm*—Arthur Reginelli

(57) ABSTRACT

A process for removing residual polymer from polymerization equipment by combining a degelling agent, residual polymer, and solvent.

17 Claims, 1 Drawing Sheet

REMOVING GELLED UNSATURATED ELASTOMERS FROM POLYMERIZATION EQUIPMENT ASSOCIATED WITH THEIR PRODUCTION

This application claims the benefit of U.S. Provisional Application No. 60/490,642, filed on Jul. 28, 2003.

TECHNICAL FIELD

This invention relates to the use of a degelling agent for removing residual polymer from equipment used to prepare polymers.

BACKGROUND OF THE INVENTION

During the production of many polymers, for example, polymers of conjugated dienes or copolymers of conjugated dienes and vinyl aromatic hydrocarbons, residual polymer tends to collect on the polymerization reactor walls and associated piping. This polymer is desirably removed for efficient subsequent use of the equipment. Removal of this polymer, however, can be difficult because the residual polymer is often gelled; i.e., it is highly crosslinked and can have a very high molecular weight.

Gelled polymer is conventionally removed by a process that includes steaming the reactor to remove hydrocarbons, employing water under increased pressure to physically fracture and break the polymer off of the equipment, draining the water and physically removing gelled polymer, and reconditioning the reactor. This process can take days to complete, and reactors may be out of service for up to two weeks during this process.

Molybdenum and tungsten metathesis catalysts have been used to depolymerize or fracture gelled polymers and thereby facilitate their removal from polymerization reactors. These catalyst compounds are employed in the presence of an olefin treating agent and a suitable solvent. Also, these catalysts are expensive and sensitive to air and moisture. When coupled with the fact that typical loadings include from 5 to about 100 parts catalyst per 100 parts polymer to be removed, these catalysts have not been technologically useful.

Thus, there exists a need in the art for a method of removing gelled polymer from polymerization reactor equipment.

SUMMARY OF THE INVENTION

A process for treating residual polymer in polymerization equipment, the process comprising: combining residual polymer, solvent, and a degelling agent that comprises a penta-coordinated or hexa-coordinated transition metal carbene complex, where the transition metal is a member of Group VIIIA of the Periodic Table.

DETAILED DESCRIPTION OF ILLUSTRATIVE EMBODIMENTS

Figure 1:
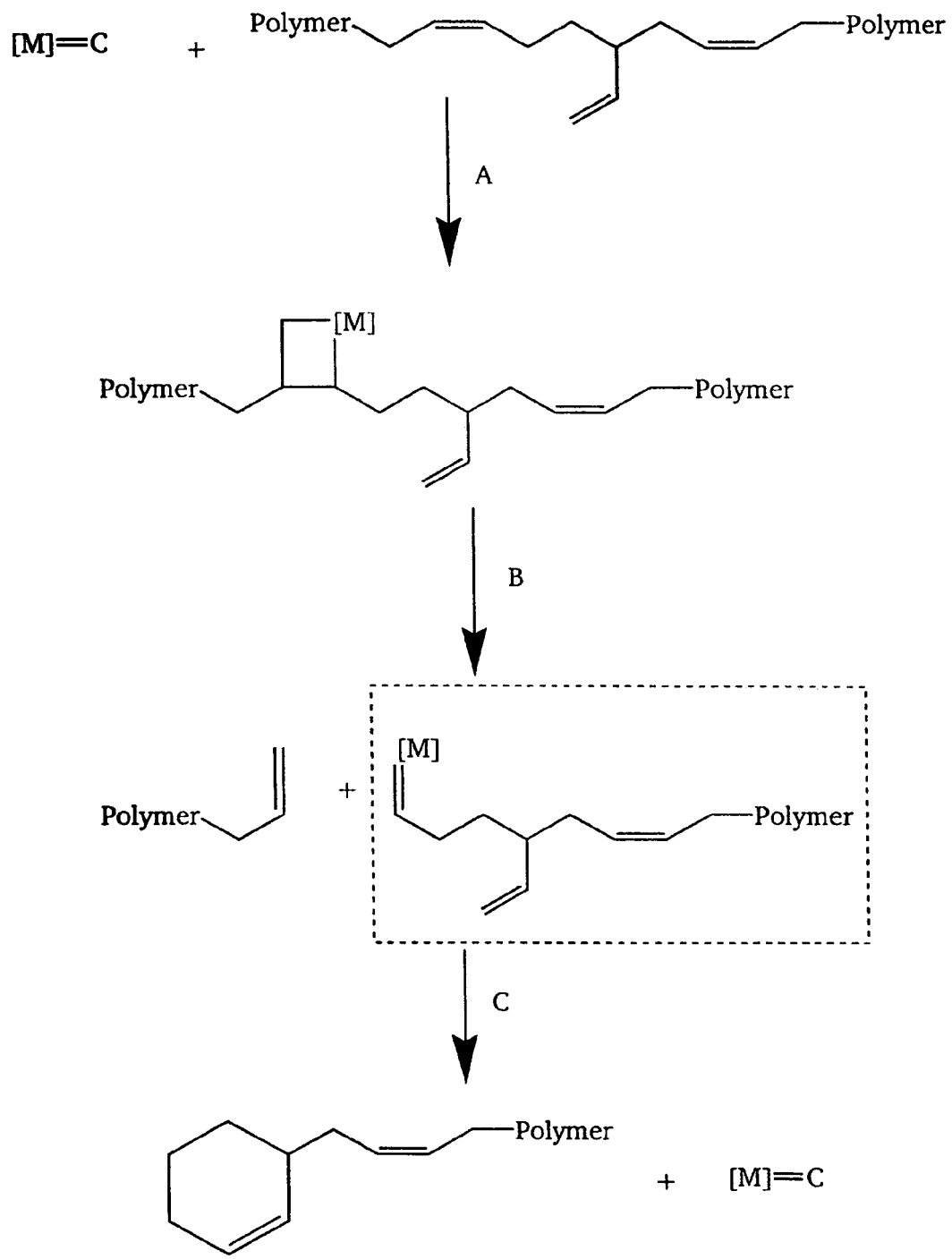
FIG. 1 is a proposed reaction scheme describing the mechanism by which the degelling agent employed in this invention is believed to proceed in achieving the goals of the invention.

In general the present invention provides process for treating residual polymer in polymerization equipment, the process comprising combining residual polymer, solvent if needed, and a degelling agent that comprises a penta-coordinated or hexa-coordinated transition metal carbene complex, where the transition metal is a member of Group VIIIA of the Periodic Table.

The present invention also includes a process for removing residual polymer from a polymerization reactor, the process comprising the steps of combining residual polymer, solvent, and a degelling agent that comprises a penta-coordinated or hexa-coordinated transition metal carbene complex, where the transition metal is a member of Group VIIIA of the Periodic Table, in a polymerization reactor for a time sufficient to degel at least a portion of the residual polymer, and removing the at least a portion of the degelled polymer, solvent and degelling agent from the reactor.

The present invention further provides a process for the removal of residual polymer from polymerization equipment, the improvement comprising the step of combining a degelling agent that comprises a penta-coordinated or hexa-coordinated transition metal carbene complex with the residual polymer, where the transition metal is a member of Group VIIIA of the Periodic Table.

Residual polymer can be removed from polymerization equipment by employing a degelling agent and solvent. In one preferred embodiment, the degelling agent includes a metathesis catalyst. In a preferred embodiment, any type of metathesis catalyst can be used, however improved results are obtained when the degelling agent includes a transition metal carbene complex. Generally, suitable transition metal carbene complexes include a positively charged metal center (e.g. in the +2 or +4 oxidation state) that is penta- or hexa-coordinated.

Preferably, the catalyst includes a transition metal from Group VIII A of the Periodic Table, according to IUPAC conventions. More preferably, the catalyst includes a ruthenium-based or osmium-based metathesis catalyst. Ruthenium-based and osmium-based carbene complex metathesis catalysts are sometimes referred to as Grubbs catalysts. Grubbs metathesis catalysts are described in U.S. Pat. Nos. 5,312,940, 5,342,909, 5,831,108, 5,969,170, 6,111,121, 6,211,391, 6,624,265, 6,696,597 and U.S. Published App. Nos. 2003/0181609 A1, 2003/0236427 A1, and 2004/0097745 A9, all of which are incorporated herein by reference.

Suitable Ru- or Os-based metathesis catalysts include compounds that can be represented by the formula

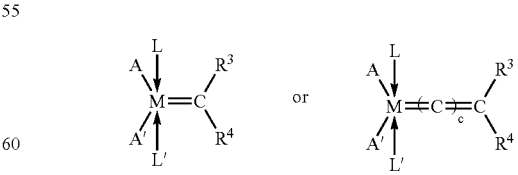

where M is ruthenium or osmium, L and L' each independently comprise any neutral electron donor ligand, A and A' each independently comprise an anionic substituent, $R^3$ and $R^4$ independently comprise hydrogen or an organic group, and c is an integer from 0 to about 5, or where two or more of $R^3$, $R^4$, L, L', A, and A' combine to form a bidentate substituent.

Preferably, L and L' independently comprise phosphine, sulfonated phosphine, phosphite, phosphinite, phosphonite, arsine, stibnite, ether, amine, amide, imine, sulfoxide, carboxyl, nitrosyl, pyridine, thioether, trizolidene, or imidazolidene groups, or L and L' may together comprise a bidentate ligand. In one embodiment, L and/or L' comprise an imidizolidene group that can be represented by the formulas

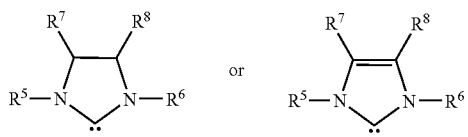

where $R^5$ and $R^6$ independently include alkyl, aryl, or substituted aryl. Preferably, $R^5$ and $R^6$ independently include substituted phenyls, and more preferably $R^5$ and $R^6$ independently include mesityl. $R^7$ and $R^8$ preferably include alkyl or aryl, or form a cycloalkyl, and most preferably are both hydrogen, t-butyl, or phenyl groups. Two or more of $R^5$, $R^6$, $R^7$ and $R^8$ can combine to form a cyclic moiety. Examples of imidazolidine ligands include 4,5-dihydroimidazole-2-ylidene ligands. Preferably, A and A' independently comprise halogen, hydrogen, $C_1$–$C_{20}$ alkyl, aryl, $C_1$–$C_{20}$ alkoxide, aryloxide, $C_2$–$C_{20}$ alkoxycarbonyl, arylcarboxylate, $C_1$–$C_{20}$ carboxylate, arylsulfonyl, $C_1$–$C_{20}$ alkylsulfonyl, $C_1$–$C_{20}$ alkylsulfinyl, each ligand optionally being substituted with $C_1$–$C_5$ alkyl, halogen, $C_1$–$C_5$ alkoxy, or with a phenyl group that is optionally substituted with halogen, $C_1$–$C_5$ alkyl, or $C_1$–$C_5$ alkoxy, and A and A' together may optionally comprise a bidentate ligand.

$R^3$ and $R^4$ are preferably each independently selected from hydrogen, $C_1$–$C_{20}$ alkyl, aryl, $C_1$–$C_{20}$ carboxylate, $C_1$–$C_{20}$ alkoxy, aryloxy, $C_1$–$C_{20}$ alkoxycarbonyl, $C_1$–$C_{20}$ alkylthio, $C_1$–$C_{20}$ alkylsulfonyl and $C_1$–$C_{20}$ alkylsulfinyl, each of $R^3$ and $R^4$ optionally substituted with $C_1$–$C_5$ alkyl, halogen, $C_1$–$C_5$ alkoxy or with a phenyl group that is optionally substituted with halogen, $C_1$–$C_5$ alkyl, or $C_1$–$C_5$ alkoxy.

In one embodiment, L or L' and A or A' may combine to form one or more bidentate ligands. Examples of this type of complex are described as Class II catalysts in U.S. Pat. No. 6,696,597. In another embodiment, $R^3$ or $R^4$ and L or L' or A or A' may combine to form one or more bidentate ligands. This type of complex is sometimes referred to as Hoveyda or Hoveyda-Grubbs catalysts. Examples of bidentate ligands that can be formed by $R^3$ or $R^4$ and L or L' include ortho-alkoxyphenylmethylene ligands.

Other useful catalysts are hexa-valent carbene compounds including those represented by the formula

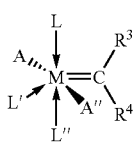

where M is ruthenium or osmium, L, L', L'' each independently comprise any neutral electron donor ligand, A, A', and A'' each independently comprise the aforementioned anionic substituent, and $R^3$ and $R^4$ independently comprise hydrogen or an organic group. In a manner similar to the penta-valent catalysts described above, one or more of the substituents in the hexa-valent complex may combine to form a bidentate substituent.

Examples of ruthenium-based carbene complexes include ruthenium, dichloro(phenylmethylene)bis(tricyclohexylphosphine), ruthenium, dichloro(phenylmethylene)bis(tricyclopentylphosphine), ruthenium, dichloro(3-methyl-2-butenylidene)bis(tricyclohexylphosphine), ruthenium, dichloro(3-methyl-2-butenylidene)bis(tricyclopentylphosphine), ruthenium, dichloro(3-phenyl-2-propenylidene)bis(tricyclohexylphosphine), ruthenium, dichloro(3-phenyl-2-propenylidene)bis(tricyclopentylphosphine), ruthenium, dichloro(ethoxymethylene)bis(tricyclohexylphosphine), ruthenium, dichloro(ethoxymethylene)bis(tricyclopentylphosphine), ruthenium, dichloro(t-butylvinylidene)bis(tricyclohexylphosphine), ruthenium, dichloro(t-butylvinylidene)bis(tricyclopentylphosphine), ruthenium, dichloro(phenylvinylidene)bis(tricyclohexylphosphine), ruthenium, dichloro(phenylvinylidene)bis(tricyclopentylphosphine), ruthenium,[2-(((2,6-bismethylethyl)-4-nitrophenyl)imino-kN)methyl-4-nitrophenolato-kO)]chloro-(phenylmethylene) (tricyclohexylphosphine), ruthenium,[2-(((2,6-bismethylethyl)-4-nitrophenyl)imino-kN)methyl-4-nitrophenolato-kO)]chloro-(phenylmethylene)(tricyclopentylphosphine), ruthenium,[2-(((2,6-bismethylethyl)-4-nitrophenyl)imino-kN)methyl-4-nitrophenolato-kO)]chloro-(3-methyl-2-butenylidene)(tricyclohexylphosphine), ruthenium,[2-(((2,6-bismethylethyl)-4-nitrophenyl)imino-kN)methyl-4-nitrophenolato-kO)]chloro-(3-methyl-2-butenylidene) (tricyclopentylphosphine), ruthenium,[1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(phenylmethylene), ruthenium, [1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(3-methyl-2-butenylidene), ruthenium, dichloro[1,3-dihydro-1,3-bis-(2,4,6-trimethylphenyl)-2H-imidazol-2-ylidene](phenylmethylene)(tricyclohexylphosphine), ruthenium, dichloro[1,3-dihydro-1,3-bis-(2,4,6-trimethylphenyl)-2H-imidazol-2-ylidene](phenylmethylene)(tricyclopentylphosphine), ruthenium, dichloro[1,3-dihydro-1,3-bis-(2,4,6-trimethylphenyl)-2H-imidazol-2-ylidene](3-methyl-2-butenylidene)(tricyclohexylphosphine), ruthenium, dichloro[1,3-dihydro-1,3-bis-(2,4,6-trimethylphenyl)-2H-imidazol-2-ylidene](3-methyl-2-butenylidene)(tricyclopentylphosphine), ruthenium, dichloro[1,3-dihydro-1,3-bis-(2,4,6-trimethylphenyl)-2H-imidazol-2-ylidene](3-phenyl-2-propenylidene)(tricyclohexylphosphine), ruthenium, dichloro[1,3-dihydro-1,3-bis-(2,4,6-trimethylphenyl)-2H-imidazol-2-ylidene](3-phenyl-2-propenylidene)(tricyclopentylphosphine), ruthenium, dichloro[1,3-dihydro-1,3-bis-(2,4,6-trimethylphenyl)-2H-imidazol-2-ylidene](ethoxymethylene)(tricyclohexylphosphine), ruthenium, dichloro[1,3-dihydro-1,3-bis-(2,4,6-trimethylphenyl)-2H-imidazol-2-ylidene](ethoxymethylene)(tricyclopentylphosphine), ruthenium, dichloro[1,3-dihydro-1,3-bis-(2,4,6-trimethylphenyl)-2H-imidazol-2-ylidene](t-butylvinylidene)(tricyclohexylphosphine), ruthenium, dichloro[1,3-dihydro-1,3-bis-(2,4,6-trimethylphenyl)-2H-imidazol-2-ylidene](t-butylvinylidene)(tricyclopentylphosphine), ruthenium, dichloro[1,3-dihydro-1,3-bis-(2,4,6-trimethylphenyl)-2H-imidazol-2-ylidene](phenylvinylidene)(tricyclohexylphosphine), ruthenium, dichloro[1,3-dihydro-1,3-bis-(2,4,6-trimethylphenyl)-2H- imidazol-2-ylidene](phenylvinylidene)(tricyclopentylphosphine), ruthenium,[1,3-bis-(2,4,6-trimethylphenyl)-2-imidazolidinylidene]-dichloro(phenylmethylene)(tricyclohexylphosphine), ruthenium,[1,3-bis-(2,4,6-trimethylphenyl)-2-imidazolidinylidene]-dichloro(phenylmethylene)(tricyclopentylphosphine), ruthenium, dichloro[1,3-bis-(2,4,6-trimethylphenyl)-2-imidazolidinylidene](3-methyl-2-butenylidene)(tricyclohexylphosphine), ruthenium,dichloro[1,3-bis-(2,4,6-trimethylphenyl)-2-imidazolidinylidene](3-methyl-2-butenylidene)(tricyclopentylphosphine), ruthenium,dichloro[1,3-bis-(2,4,6-trimethylphenyl)-2-imidazolidinylidene](3-phenyl-2-propylidene)(tricyclohexylphosphine), ruthenium, dichloro[1,3-bis-(2,4,6-trimethylphenyl)-2-imidazolidinylidene](3-phenyl-2-propylidene)(tricyclopentylphosphine), ruthenium,[1,3-bis-(2,4,6-trimethylphenyl)-2-imidazolidinylidene]-dichloro(ethoxymethylene)(tricyclohexylphosphine), ruthenium,[1,3-bis-(2,4,6-trimethylphenyl)-2-imidazolidinylidene]-dichloro(ethoxymethylene)(tricyclopentylphosphine), ruthenium,[1,3-bis-(2,4,6-trimethylphenyl)-2-imidazolidinylidene]-dichloro(t-butylvinylidene)(tricyclohexylphosphine), ruthenium,[1,3-bis-(2,4,6-trimethylphenyl)-2-imidazolidinylidene]-dichloro(t-butylvinylidene)(tricyclopentylphosphine), ruthenium,[1,3-bis-(2,4,6-trimethylphenyl)-2-imidazolidinylidene]-dichloro(phenylvinylidene)(tricyclohexylphosphine), and ruthenium,[1,3-bis-(2,4,6-trimethylphenyl)-2-imidazolidinylidene]-dichloro(phenylvinylidene)(tricyclopentylphosphine).

Commercially available Ru-based metathesis catalysts include ruthenium dichloro(phenylmethylene)bis(tricyclohexylphosphine) (sometimes referred to as Grubbs First Generation Catalyst), ruthenium [1,3-bis-(2,4,6-trimethylphenyl)- 2-imidazolidinylidene]dichloro(phenylmethylene) (tricyclohexylphosphine) (sometimes referred to as Grubbs Second Generation Catalyst), ruthenium dichloro [[2-(1-methylethoxy)phenyl]methylene](tricyclohexylphosphine), (sometimes referred to as Hoveyda-Grubbs First Generation Catalyst), and ruthenium [1,3-bis(2,4,6-trimethylphenyl)-2-imidazolidinylidene]dichloro[[2-(1-methylethoxy)phenyl]methylene], (sometimes referred to as Hoveyda-Grubbs Second Generation Catalyst). These Ru-based metathesis catalysts are available from Materia Inc. (Pasadena, Calif.).

Residual polymer that is treated includes polymer that remains within polymerization equipment following polymerization. In one embodiment, the residual polymer remains after conventional procedures are employed to remove the synthesized polymer from the equipment such as solvent washing. Residual polymer is believed to include gelled polymer or polymer of extremely high molecular weight that is not soluble in conventional solvents. Typically, residual polymer is solvent-swollen, rigid, and non-flowing.

The primary molecular weight of the residual polymers, which refers to the number-average molecular weight ($M_n$) before cross-linking and gelation, can vary widely. In one embodiment, the primary molecular weight of the residual polymer is from about 1 kilogram per mole (kg/mol) to about 10 megagrams per mole (Mg/mol), and preferably from about 10 to about 500,000 kg/mol.

Preferably, the residual polymer includes one or more metathesis-reactive double bonds. The double bond may be internal (i.e., within the polymer backbone) or external. In a preferred embodiment, the residual polymer includes at least one metathesis-reactive internal double bond, more preferably at least one metathesis-reactive internal double bond per every about 1,000 monomer units, and even more preferably at least one metathesis-reactive internal double bond per every about 100 monomer units.

In a preferred embodiment, the residual polymer includes both internal and external unsaturation. Preferably, the residual polymer includes at least one metathesis-reactive external double bond, more preferably at least one metathesis-reactive external double bond per every about 1,000 monomer units, even more preferably at least one metathesis-reactive external double bond per every about 200 monomer units, and still more preferably at least one metathesis-reactive external double bond per every about 100 monomer units. Alternatively, the preferred amount of external unsaturation may be expressed as at least about 0.1 mole percent, more preferably at least about 0.5 mole percent, and even more preferably at least about 1 mole percent external unsaturation.

Residual polymers that may be treated according to the process of the present invention include unsaturated polymers of cyclic monoolefins, such as cyclopentene, homopolymers of conjugated diene monomers containing 4–12 carbon atoms per molecule, copolymers of two or more diene monomers containing from 4–12 carbon atoms per molecule, copolymers of vinyl, alpha olefin, or ethylene monomers with diene monomers containing 4–12 carbon atoms per molecule, copolymers of diene monomers containing from 4–12 carbon atoms per molecule with vinyl aromatic monomers containing 8–26 carbon atoms per molecule, and mixtures thereof. Preferably, the residual polymer contains at least 5 parts by weight of conjugated diene per 100 parts by weight of the copolymer.

Examples of residual polymers include butadiene and isoprene homopolymers, styrene-butadiene copolymers, butadiene-isoprene copolymers, isoprene-styrene copolymers, butadiene-isoprene-styrene copolymers, EPDM (ethylene propylene diene copolymers), butadiene-acrylonitrile, and butyl rubber.

It will be understood that the residual polymer may also contain other substances, such as impurities that were present in the reactants, solvent, or other ingredients of the polymerization reaction, contaminants from the reactor or other equipment, or additives that were added to the polymerization mixture. For example, typical additives that are employed in polymerization reactions include polymerization initiators, catalysts, antioxidants, alkyl aluminum residues, and alcohol terminating agents. In some embodiments, these other substances in the residual polymer may be present in amounts up to about 5% by weight, possibly up to about 2% by weight, and possibly up to about 1% by weight, based upon the total weight of the residual polymer.

In one embodiment, the degelling agent and a solvent are added to polymerization equipment containing residual polymer in order to remove the residual polymer.

The solvent is preferably an organic compound and may be polar or non-polar. In a preferred embodiment, the solvent is one in which the treated or degelled polymer is soluble. Suitable solvents include aliphatic, cycloaliphatic, and aromatic hydrocarbons. Examples of suitable solvents include tetrahydrofuran, various cyclic and acyclic hexanes, heptanes, octanes, pentanes, toluene, xylenes, their alkylated derivatives, and mixtures thereof. In one embodiment, when the residual polymer contains appreciable amounts of saturated block polymer, it is preferable to have solvent present in which the saturated block polymer is soluble. In one way, the process of the present invention differs from prior art processes in that the solvent does not have to be highly purified. In one embodiment, the process is compatible with a solvent with at least 1% impurities. In another embodiment, the process is compatible with a solvent with at least 2% impurities. In yet another embodiment, the process is compatible with a solvent with at least 3% impurities. In one embodiment, one of the impurities present in the solvent is water. In another embodiment, one of the impurities present in the solvent is an alcohol. In another embodiment, the process is compatible with impurities of less than about 10% amine. If desired, however, the solvent may be de-gassed by using an inert gas such as nitrogen.

The order of addition of components used to remove residual polymer is not critical. In one embodiment, the degelling agent and solvent are premixed and the degelling agent is dissolved or suspended in the solvent. In another embodiment, the degelling agent is premixed with a small amount of solvent to form a concentrated mixture, and the mixture is added to the reactor before, after, or along with additional solvent. In yet another embodiment, the degelling agent is added to the reactor or polymerization equipment as a powdered solid. When the degelling agent is added as a powdered solid, it may be added before, after, or at the same time as the solvent. In one embodiment, the degelling agent and/or degelling agent/solvent mixture is added to the polymerization equipment as a continuous feed. If desired, the degelling agent may be prepared in situ. For example, a Ru or Os compound can be combined with an alkyne and an appropriate ligand under reaction conditions to form a metal carbene complex such as those described above.

The amount of degelling agent needed to treat the residual polymer is not particularly limited and may vary based upon the amount of the residual polymer. In one embodiment, the amount of degelling agent is expressed in terms of millimoles of the transition metal as a function of residual polymer. Preferably, the degelling agent is present in an amount of from about 0.001 to about 20 millimoles of metal per 100 grams of residual polymer, more preferably from about 0.005 to about 15 millimoles, even more preferably from about 0.01 to about 10 millimoles, and still more preferably from about 0.1 to about 5 millimoles of metal per 100 grams of residual polymer.

The amount of solvent used to treat the residual polymer is not particularly limited and may vary based upon the available capacity of the reactor or other polymerization equipment. The available capacity refers to the reactor volume less the capacity that is taken up by the residual polymer. Preferably, the solvent or the solvent/degelling agent mixture fills the reactor to at least 80% of the reactor's available capacity, more preferably to at least about 90% of its available capacity, and even more preferably to at least about 95% of its available capacity. In one embodiment, where the polymerization equipment is a reactor that is operated under pressure during the degelling process, the solvent or the solvent/degelling agent mixture does not completely fill the reactor.

In one embodiment, the degelling agent is premixed with a small amount of solvent to form a concentrated mixture, which may be a solution or slurry. The concentrated mixture can be prepared by simply blending the degelling agent with a solvent. In a preferred embodiment, the concentrated mixture includes from about 0.001 to about 75% by weight degelling agent, preferably from about 0.05 to about 50% by weight degelling agent, and more preferably from about 0.1 to about 25% by weight degelling agent, based on the entire weight of the concentrated mixture.

Once both the degelling agent and solvent have been added to the polymerization equipment and mixed, the amount of degelling agent in the solvent/degelling agent mixture in the reactor preferably includes from about 0.1 to about 300 mmol metal per one cubic meter solvent (mmol/$m^3$), more preferably from about 1 mmol/$m^3$ to about 100 mmol/$m^3$, and even more preferably from about 10 mmol/$m^3$ to about 50 mmol/$m^3$.

The reactor headspace refers to that portion of the reactor that is not filled with residual polymer, degelling agent, or solvent. Preferably, the headspace does not contain oxygen. In a preferred embodiment, the reactor is purged with an inert gas such as nitrogen prior to addition of the degelling agent or solvent/degelling agent mixture.

Preferably, the degelling agent and solvent are added to the reactor under ambient conditions. In a preferred embodiment, the reactor is then pressured with an inert gas, such as nitrogen. Preferably, the reactor is pressurized to from about 0.1 to about 1.2 millipascal (mPa) and more preferably from about 0.2 to about 1.0 mPa.

During the degelling process, the measured internal reactor temperature is preferably from about minus 20° C. to about 120° C., more preferably from about ooC to about 100° C., even more preferably from about 20° C. to about 70° C.

The solvent/degelling agent mixture is preferably circulated through the reactor and optionally through the associated piping to enhance contact between the mix and residual polymer. This is preferably accomplished within a closed loop system. In a preferred embodiment, the mixture is agitated or stirred.

The amount of time that the solvent/degelling agent is kept in the reactor, which may be referred to as the contact time, is not particularly limited. In general, the contact time should be sufficient for the residual polymer to be fractured or depolymerized (i.e. degelled) such that it becomes soluble or miscible with the solvent, this time may vary depending upon the thickness and chemical makeup of the residual polymer. Preferably, the contact time is from about 10 minutes to about 48 hours, more preferably from about 1 hour to about 24 hours, and more preferably from about 2 to about 12 hours.

The progress of the degelling process may be monitored by a number of methods. For example, the flow rate of the ingredients circulating through the reactor may be monitored. When significant amounts of gelled polymer exist within the reactor and piping, the flow rate is negatively impacted. The flow rate is therefore inversely proportional to the amount of gelled polymer within the equipment, and can be used to indicate blockage due to the presence of residual polymer.

In another embodiment, the pressure needed to pump the mixture through the reactor is monitored. Generally, as the gelled polymer breaks down to flowable and soluble components, the amount of pressure necessary to pump the ingredients through the reactor and associated piping will decrease and eventually reach a plateau indicating the removal of at least a portion of residual polymer.

In yet another embodiment, the force necessary to agitate the ingredients within the reactor is monitored. Typically, the force required to turn the agitator will increase as the residual polymer is degelled and dissolves in the solvent, and will reach a plateau indicating the removal of at least a portion of gelled polymer.

An additional method of monitoring the progress of the degelling process is by periodically measuring the percent solids of a sample of solvent/degelling agent mixture taken from the reactor. The amount of solids in the solvent will increase as the polymer is degelled and will reach a plateau as the residual polymer is removed.

In a preferred embodiment, the polymer chains of the residual polymer are broken down via metathesis reaction and the molecular weight of the residual polymer is decreased. Preferably, the degelled polymer has a number average molecular weight of less than about 300 kg/mole, more preferably less than about 200 kg/mole, even more preferably less than about 100 kg/mole.

Once the residual polymer is dissolved in the solvent/ degelling agent mixture, it may be removed from the reactor by conventional means. In a preferred embodiment, the solvent mixture containing the degelled polymer is pumped out of the reactor. If separation of the degelling agent from the polymer is desired, it may be carried out using methods well known in the art.

The reactor need not be treated after the cleaning process of this invention. This is true despite the fact that the reactor may subsequently be used in conjunction with sensitive catalysts such as anionic or coordination catalyst systems. Nonetheless, steps can be taken to remove residual degelling agent from the reactor or to inactivate the degelling agent. For example, the reactor and feed lines can be purged with one or more solvent washings. Or, an agent such as the alkyl aluminum (e.g., triisobutyl aluminum) can be added to the reactor. In one embodiment, the neutralizing agent (i.e., trialkyl aluminum) is dissolved in a solvent, which is run through the reactor and feed lines.

Prior art degelling processes often required the use of olefin additives, sometimes referred to as olefin treating agents. While not required for the present process, these additives can be employed if desired. Olefin additives typically include non-tertiary, nonconjugated acyclic mono- and polyenes having at least 2 carbon atoms per molecule, including cycloalkyl, cycloalkenyl, and aryl derivatives thereof; cyclic mono- and polyenes having at least 4 carbon atoms per molecule including alkyl and aryl derivatives thereof, mixtures of the above olefins; and mixtures of ethylene and the above olefins. Useful olefin treating agents include acyclic olefins having from 2 to about 30 carbon atoms per molecule and cyclic olefins having from 4 to about 30 carbon atoms per molecule. Non-tertiary olefins are those olefins having at least one double bond, where the carbon atoms that are attached to each other by means of the double bond are also attached to at least one hydrogen atom.

Some specific examples of acyclic olefins suitable for reactions of this invention include ethylene, propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenyl-2-butene, 4-octene, 3-eicosene, 3-heptene, 3-hexene, 1,4-pentadiene, 1,4,7-dodecatriene, 2-methyl-4-octene, 4-vinylcyclohexene, 1,7-octadiene, 1,5-eicosadiene, 2-triacontene, 2,6-dodecadiene, 1,4,7,10,13-octadecapentaene, 8-cyclopentyl-4,5-dimenthyl-1-decene, 6,6-dimethyl-1,4-octadiene, styrene, substituted styrenes, and mixtures thereof.

Some specific examples of cyclic olefins suitable for the reactions of this invention are cyclobutene, cyclopentene, cycloheptene, cyclooctene, 5-n-propylcyclooctene, cyclodecene, cyclododecene, 3,3,5,5-tetramethylcyclononene, 3,4,5,6,7pentaethylcyclodecene, 1,5-cyclooctadiene, 1,5,9-cyclododecatriene, 1,4,7,10-cyclododecatetraene, 6-methyl-6-ethylcyclooctadiene-1,4, and mixtures thereof.

Lower molecular weight olefins such as ethylene, propylene, butenes, pentenes, and hexenes are most frequently employed, but the choice of olefin is governed by the type of diene polymer treated and the results desired. A preferred olefin treating agent is 2-butene.

Advantageously, where the residual polymer includes external unsaturation, the degelling process of the present invention can be performed in the absence of olefin additives. Thus, while olefin additives may optionally be added to the reactor, in a preferred embodiment the amount of olefin additives is limited. Preferably, the amount of olefin added to the reactor is less than 10% by weight based upon the total weight of the residual polymer, more preferably less than about 5%, even more preferably less than about 2%, still more preferably less than about 1%. In one embodiment, the reactor is devoid of olefin additive.

Without wishing to be bound by any particular theory, it is believed that the degelling agent employed in this invention reacts with the residual polymer by way of olefin metathesis. The residual polymer is thereby changed in a manner that facilitates its removal from the polymerization equipment. This change is referred to as degelling. One proposed mechanism for this change is shown in FIG. 1. That is, it is believed that one manner in which the degelling agent operates is that the transition metal carbene complex interacts with polymer unsaturation within the residual polymer and effects a bond exchange that results in breaking the polymer chain into shorter or more soluble segments (i.e. depolymering or fracturing).

Specifically, it is believed that the metal carbene complex interacts with vinyl unsaturation or backbone unsaturation within the residual polymer to form a metallacyclobutane complex reactive intermediate. Further reaction results in fragmentation of the polymer chain. For example, in the scheme shown in FIG. 1, the carbene and polymer associate (at A) to form a metallocyclobutane, and a metathesis exchange reaction occurs (at B) to break the original polymer. Notably, a new metal carbene unit ([M]=C) is formed in one of the polymeric fragments (the polymeric fragment is circled in FIG. 1). Thereafter, a metathesis exchange reaction occurs between the new metal carbene unit and a neighboring external unsaturation within the polymer, causing a cyclic member to be formed at the end of the polymeric fragment and freeing a metal carbene unit for further reaction. In some embodiments, it is believed that high molecular weight polymers and gelled polymeric networks are reduced to lower molecular weight polymeric fragments, or are converted to more soluble substances.

Stated another way, it is believed that the degelling agent employed herein cyclize double bonds within an unsaturated polymer by interacting with the double bonds of the external unsaturation. This breaks the long, substantially solid, non-flowing diene polymer network to produce shorter, more fluid polymers capable of draining out of the reactor under the influence of gravity or at least less labor intensive flushing techniques.

As those skilled in the art will readily appreciate, where olefin is added to assist in the cleaning of the reactors, the mechanism for altering the molecular weight of the residual polymer is believed to proceed by way of a classical cross-metathesis reaction.

The process of the present invention can reduce the need for conventional steam treating, high-pressure water cleaning, and re-conditioning of a polymerization reactor prior to the use of the reactor for subsequent polymerization reactions. Whether the polymerization reactions are alternating from anionic initiated polymerization to Zeigler catalyst initiation or vice versa, reconditioning after carrying out depolymerization according to this invention will generally not be required. Advantageously, additional polymerization reactions can optionally be conducted without the need for rinsing the reactor out with an appropriate solvent. Also, the degelling agent employed in this invention can be used immediately after polymerization without the need to inactivate the polymerization catalyst.

The process of this invention can be employed to clean polymerization reactors, including those used in batch polymerization, semi-batch polymerization, continuous polymerization, and semi-continuous polymerization. The pipes associated with polymerization reactors can also be cleaned. Also, the process of this invention can be used to remove residual polymer from polymer processing equipment, such as extruders and mixers.

In some embodiments, the time that it takes to clean a reactor can be reduced to less than 24 hours. The degelling process does not compromise the reactor and therefore the burdensome reconditioning steps employed in the prior art can typically be avoided. Also, the unexpected efficiency of the degelling agent employed in this invention for removing residual polymer from polymerization reactors allows for efficient cleaning at lower levels of degelling agent. This translates into many benefits including less contamination and improved economic efficiency. Further, olefin addition is not required. Still further, the degelling agent is effective in the presence of many additives, impurities, and contaminants.

In order to demonstrate the practice of the present invention, the following examples have been prepared and tested. The examples should not, however, be viewed as limiting the scope of the invention. The claims will serve to define the invention.

EXPERIMENTAL

Example 1

Degelling was performed in a reactor having a volume capacity equivalent to 50.0 kilograms (kg) of hexanes at room temperature. A volume check was performed after nickel-catalyzed polybutadiene was synthesized in the reactor, indicating a free volume of 48.2 kg and a solvent swollen gel volume of approximately 1.8 kg of hexanes. The reactor was filled to near capacity with dry hexanes. A suspension was prepared of 0.5 grams (g) of bis(tricyclohexylphosphine)benzylidene ruthenium (IV) dichloride, in 200 milliliters (mL) dry, nitrogen-purged cyclohexane. The solvent/degelling agent suspension was added to the reactor via an injection port, and mixed with the solvent that was already present. The mixture was stirred using an agitator and heated to 65° C. for 16 hours. After this period, the contents of the reactor were emptied, and a new volume check was performed on the reactor, which indicated 50.0 kg of hexanes. After the volume check, the contents of the reactor were emptied and the reactor was returned to service. Neodymium-catalyzed polybutadiene was then successfully polymerized in the reactor.

Example 2

After conducting a neodymium-catalyzed polybutadiene synthesis reaction, it was found that the piping leading from the polymerization reactor was partially plugged. As a result, excessive pressure was noted in the system when material was pumped through. The pipeline was filled with dry, nitrogen-purged cyclohexane. A suspension of 2 g of tricyclohexylphosphine[1,3-bis(2,4,6-trimethylphenyl)-4,5-dihydroimidazol-2-ylidene][benzylidine]ruthenium (IV) dichloride, in 500 mL dry, nitrogen-purged cyclohexane, was added to the pipeline feed. The solvent/degelling agent suspension was pumped through the system in a continuous loop at room temperature. Within 3 hours, the line pressure had dropped 138 kilopascals (kPa) and the solvent line filter was filled with polymer residue and polymerization catalyst particulates. The filter was cleared, and the recirculation process was continued. Within go minutes, another pressure drop of 69 kPa was observed, lowering the pipe pressure to normal operating pressures.

Example 3

After synthesizing nickel-catalyzed polybutadiene, the free volume of the polymerization reactor dropped from 49.4 to 37.6 kg of hexanes. The reactor was filled with hexanes, and a solution of 2 g of tricyclohexylphosphine[1,3-bis(2,4,6-trimethylphenyl)-4,5-dihydroimidazol-2-ylidene][benzylidine]ruthenium (IV) dichloride, in 400 mL dry nitrogen-purged toluene, was added via an injection port. The contents of the reactor were heated to 57° C. and agitated for 20 hours. During the degelling process, the solids content of the hexanes increased from 0.5 to 3.7%, indicating the presence of solubilized residual polymer. After the contents of the reactor were drained, the reactor was filled with new clean hexanes. The new volume check was 49.3 kg of hexanes and the reactor was returned to service.

Example 4

A polymerization reactor with a volume check of 16.4 kg of hexanes was found to contain gel after a neodymium-catalyzed polybutadiene synthesis process. The reactor contained 17% by volume of solvent-swollen gel, and the free volume was reduced to 13.6 kg of hexanes. One gram of bis(tricyclohexylphosphine)benzylidene ruthenium (IV) dichloride was added to the reactor as a suspension in hexanes. The contents of the reactor were heated to 40° C. for 18 hours while being stirred. After this time period, the contents of the reactor were drained and a new volume check was performed, indicating the reactor was completely degelled (16.4 kg hexanes). The reactor was then flushed with warm hexanes and returned to service. Lithium-catalyzed styrene-butadiene rubber was then successfully synthesized in the vessel.

Example 5

Neodymium-catalyzed polybutadiene was synthesized in a 6.5-gallon (16.4 kg hexanes) polymerization reactor. After the process was completed, it was determined via a volume check (13.1 kg hexanes) that the reactor contained approximately 20% solvent swollen gel. One gram of bis(tricyclohexylphosphine)benzylidene ruthenium (IV) dichloride was added to the reactor as a suspension in hexanes. The contents of the reactor were heated to 40° C. for 24 hours while being stirred. After this time period, the contents of the reactor were drained and a new volume check was performed, indicating the reactor was completely degelled (16.4 kg hexanes). The reactor was then flushed with warm hexanes and returned to service. Neodymium-catalyzed polybutadiene was then successfully synthesized in the vessel.

Example 6

A polymerization reactor with an internal volume equivalent to 16.4 kg of hexane was utilized for the preparation of lithium-catalyzed styrene-butadiene rubber. After the process was complete, a volume check was performed on the reactor. The free volume was found to be equivalent to 12.3 kg hexane, with the remaining volume occupied by solvent swollen gel. One gram of bis(tricyclohexylphosphine)benzylidene ruthenium (IV) dichloride was added to the reactor as a suspension in hexanes. The contents of the reactor were heated to 45° C. for 24 hours while being stirred. After this time period, the contents of the reactor were drained and a new volume check was performed, indicating the reactor was completely degelled (16.4 kg hexanes). The reactor was then flushed with warm hexanes and returned to service. Lithium-catalyzed styrene-butadiene rubber was then successfully synthesized in the vessel.

Example 7

Degelling was performed in a reactor having a volume capacity equivalent to 49.0 kilograms (kg) of hexanes at room temperature. A volume check was performed after nickel-catalyzed polybutadiene was synthesized in the reactor, indicating a free volume of 40.8 kg and a solvent swollen gel volume of approximately 8.2 kg of hexanes. The reactor was filled to near capacity with dry hexanes. A suspension was prepared of 2 grams (g) of bis(tricyclohexylphosphine) benzylidene ruthenium (IV) dichloride, in 830 milliliters (mL) dry, nitrogen-purged cyclohexane. The solvent/degelling agent suspension was added to the reactor via an injection port, and mixed with the solvent that was already present. The mixture was stirred using an agitator and heated to 31° C. for about 2 hours. The reactor temperature was then increased for about 2 /1;2 hours to deactivate the degelling agent. After this period, 300 mL triisobutyl alcohol was added, and the reactor temperature was reduced. The contents of the reactor were emptied, and a new volume check was performed on the reactor, which indicated 49.0 kg of hexanes.

Various modifications and alterations that do not depart from the scope and spirit of this invention will become apparent to those skilled in the art. This invention is not to be duly limited to the illustrative embodiments set forth herein.

What is claimed is:

1. A process for treating residual polymer in polymerization equipment comprising:
combining residual polymer, solvent, and a degelling agent that comprises a penta-coordinated or hexa-coordinated transition metal carbene complex, where the transition metal is selected from the group consisting of ruthenium and osmium.

2. The process of claim 1, where the degelling agent can be represented by the formula

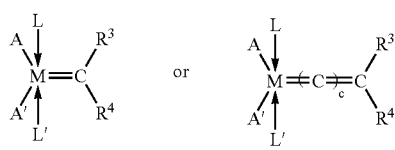

where M is ruthenium or osmium, L and L' each independently comprise any neutral electron donor ligand, A and A' each independently comprise an anionic substituent, $R^3$ and $R^4$ independently comprise hydrogen or an organic group, and c is an integer from 0 to about 5, or where two or more of $R^3$, $R^4$, L, L', A, and A' combine to form a bidentate substituent.

3. The process of claim 1 where the degelling agent comprises a Grubbs or Hoveyda-Grubbs type metathesis catalyst.

4. The process of claim 1, where the amount of degelling agent present comprises from about 0.001 to about 20 millimoles of metal per 100 grains of residual polymer.

5. The process of claim 1, where the residual polymer includes at least one metathesis-reactive external double bond per every about 1,000 monomer units.

6. The process of claim 5, where the process is devoid of added olefin.

7. The process of claim 1, where the residual polymer contains additives, contaminants or impurities.

8. The process of claim 1, where the process further comprises the step of pre-mixing the degelling agent and a portion of the solvent prior to combining residual polymer, solvent, and degelling agent.

9. A process for removing residual polymer from a polymerization reactor comprising:
combining residual polymer, solvent, and a degelling agent that comprises a penta-coordinated or hexa-coordinated transition metal carbene complex, where the transition metal is selected from the group consisting of ruthenium and osmium, in a polymerization reactor for a time sufficient to degel at least a portion of the residual polymer and the residual polymer in the solvent; and
removing the degelling agent, solvent, and at least a portion of the degelled residual polymer from the reactor.

10. The process of claim 9, where the degelling agent can be represented by the formula

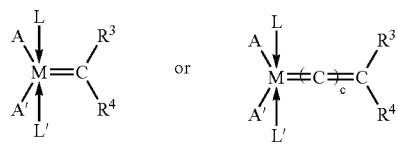

where M is ruthenium or osmium, L and L' each independently comprise any neutral electron donor ligand, A and A' each independently comprise an anionic substituent. $R^3$ and $R^4$ independently comprise hydrogen or an organic group, and c is an integer from 0 to about 5, or where two or more of $R^3$, $R^4$L, L', A, and A' combine to form a bidentate substituent.

11. The process of claim 9, where the degelling agent comprises a Grubbs or Hoveyda-Grubbs type metatheses catalyst.

12. The process of claim 9, where the amount of degelling agent present comprises from about 0.001 to about 20 millimoles of metal per 100 grams of residual polymer.

13. The process of claim 9, where the residual polymer includes at least one metathesis-reactive external double bond per every about 1,000 monomer units.

14. The process of claim 13, where the process is devoid of added olefin.

15. The process of claim 9, where the residual polymer contains additives, contaminants or impurities.

16. The process of claim 9, where the process further comprises the step of pre-mixing the degelling agent and a portion of the solvent prior to combining residual polymer, solvent, and degelling agent.

17. In a process for the removal of residual polymer from polymerization equipment, the improvement comprising the step of combining a degelling agent that comprises a penta-coordinated or hexa-coordinated transition metal carbene complex with the residual polymer, where the transition metal is selected from the group consisting of ruthenium and osmium.

* * * * *